United States Patent [19]

Kimura

[11] 4,393,339
[45] Jul. 12, 1983

[54] MOTOR APPARATUS

[75] Inventor: Kenji Kimura, Tachikawa, Japan

[73] Assignee: Olympus Optical Co., Ltd., Tokyo, Japan

[21] Appl. No.: 239,496

[22] Filed: Mar. 2, 1981

[30] Foreign Application Priority Data

Mar. 7, 1980 [JP] Japan .................................. 55-28692

[51] Int. Cl.³ .............................................. H02K 29/00
[52] U.S. Cl. ...................................... 318/254; 318/138
[58] Field of Search ........................... 318/254 A, 254

[56] References Cited

U.S. PATENT DOCUMENTS 4,086,519 4/1978 Persson ................................. 318/254

4,164,691 8/1979 Wada ..................................... 318/254

Primary Examiner—J. V. Truhe
Assistant Examiner—Saul M. Bergmann
Attorney, Agent, or Firm—Frishauf, Holtz, Goodman and Woodward

[57] ABSTRACT

Disclosed is a motor apparatus in which the rotation speed of the rotor is controlled by pulse width changes of drive currents which provide a rotating magnetic field around the rotor. A non-saturated type amplifier with poor efficiency can be removed from the motor power supply circuit, thus enabling the motor power supply circuit to be formed only by a circuit having a switching operation.

10 Claims, 13 Drawing Figures

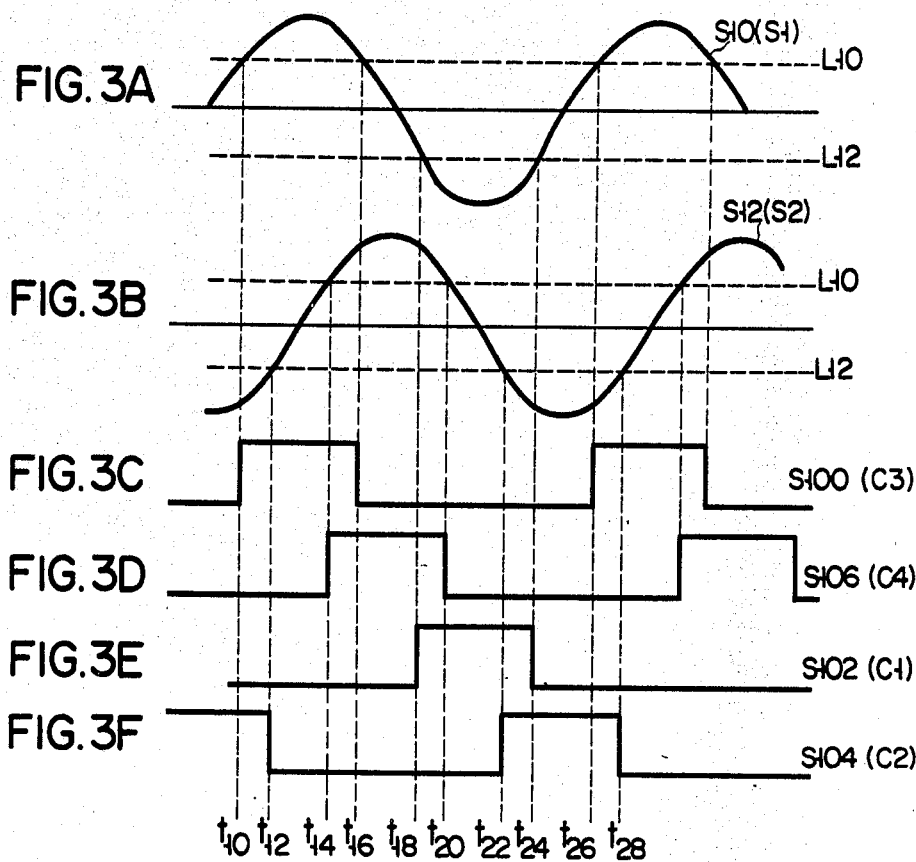
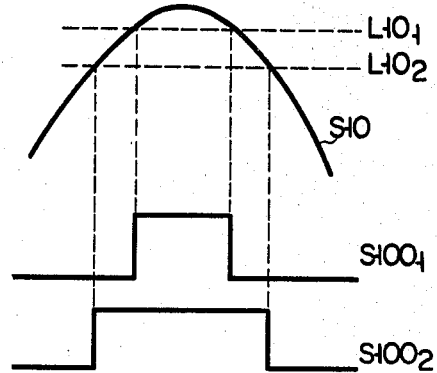

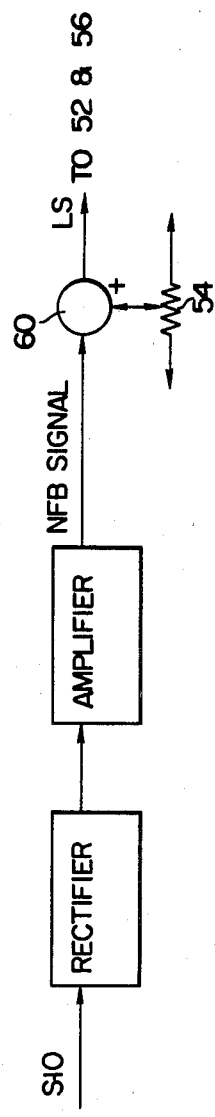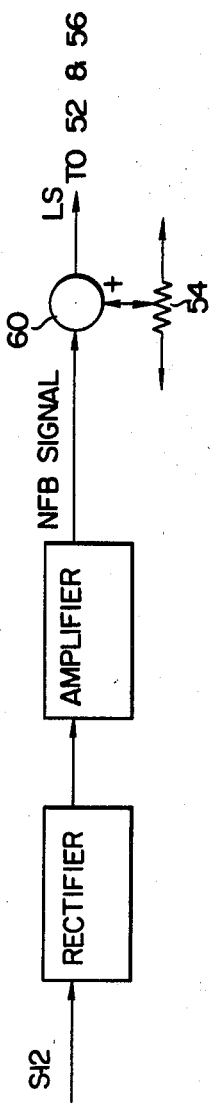

MOTOR APPARATUS

BACKGROUND OF THE INVENTION

The present invention relates to a motor apparatus and, more particularly, to a motor apparatus suitable for use as a brushless multiphase motor in which the rotation speed of a rotor is electrically controlled.

There has been well known as a typical one of brushless multiphase motors the Hall motor in which the rotation of a rotor is detected by a Hall element and this detected result is used to generate a rotating magnetic field around the rotor. Namely, the rotational position of the rotor is detected by the Hall element and this detected result is used to sequentially supply drive current to plural poles (or phases) arranged around the rotor. Sequential supply of this drive current is achieved by a switching circuit. The rotating magnetic field thus generated serves to give a rotational force to the rotor.

A rotating magnetic field is generated by a switching circuit as described above, and the efficiency of the circuit itself which serves to drive poles of a motor is therefore high in the conventional motor apparatus. However, in the case of the conventional brushless motor typically represented by the Hall motor, the rotation control of the motor is attained by changing the supply voltage (or current) common to each of the poles of the motor. Namely, the rotation of the rotor is controlled by changing the magnitude of drive current generated by a switching operation. Therefore, a non-saturated type current amplifier (or class A amplifier) is needed to control the drive current, so that the high efficiency attained by the switching operation is offset by the low efficiency of the non-saturated type current amplifier, thus preventing the conventional motor apparatus from being made highly efficient.

SUMMARY OF THE INVENTION

The present invention is intended to eliminate the above-mentioned drawback. The object of the present invention is therefore to provide a motor apparatus whose efficiency is improved.

In order to achieve the object of the present invention, the present invention provides a motor apparatus in which the rotation of a rotor is controlled by changing the pulse width of the drive current which provides the rotating magnetic field around the rotor. As a result, a non-saturated type amplifier circuit with low efficiency can be removed from a motor power supply circuit, such that the motor power supply circuit can be formed only by a circuit with a switching operation, thus enabling the motor apparatus to be made efficient.

BRIEF DESCRIPTION OF THE DRAWINGS

FIGS. 3A through 3F show a timing chart for explaining a level slicing-off operation in the circuit shown in FIG. 2;

FIG. 4 is a waveform diagram showing how drive pulses applied to the motor shown in FIG. 1 vary according to changes of threshold level in the circuit shown in FIG. 2;

FIGS. 6A and 6B show variations of the circuit shown in FIG. 2.

DETAILED DESCRIPTION OF THE PREFERRED EMBODIMENT

It is to be expressly understood that like reference symbols are used to designate like portions throughout the drawings for simplicity of illustration and that components designated by like reference symbols may easily be replaced with each other or one another with minor change by a person skilled in the art.

Figure 1:
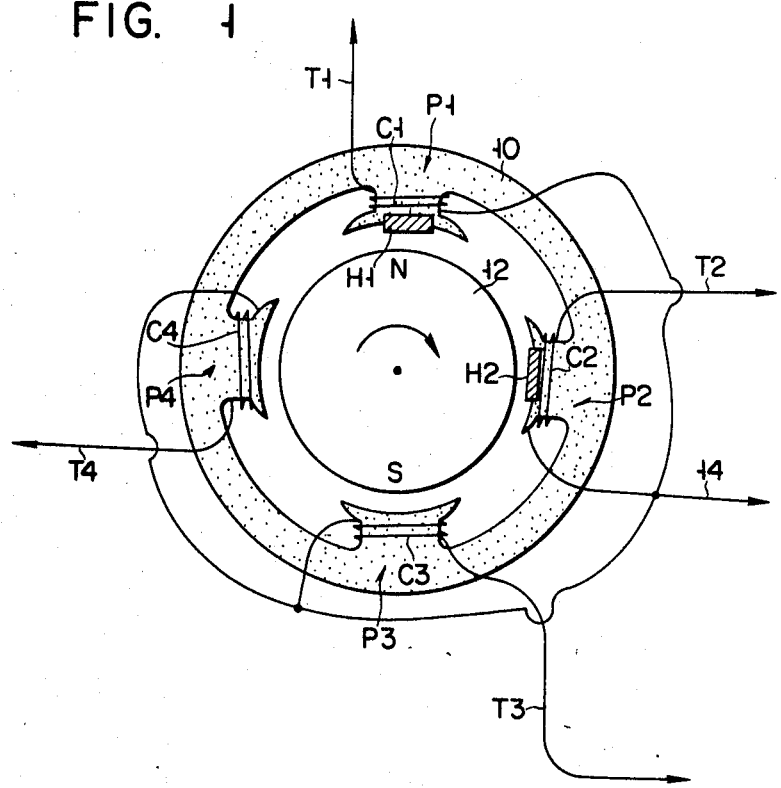
FIG. 1 is a sectional view showing the arrangement of a motor employed as an embodiment of the present invention.

FIG. 1 shows a structure of a 4-phase (4-pole) Hall motor. Four magnetic poles P1–P4 are formed with 90° shifted from one another in a stator 10. Wound round these magnetic poles are coils C1–C4 for generating the magnetic field in the stator 10. Hall elements H1 and H2 are attached to the top ends of magnetic poles P1 and P2, respectively. A magnet rotor 12 is arranged in the center of magnetic poles P1–P4. Hall elements H1 and H2 are used as detection means for generating a detection signal corresponding to a position of rotor 12. One end of each of coils C1–C4 is connected to a common power supply line 14 while the other (or power supply ends T1–T4) are lead outside independently.

Figure 2:
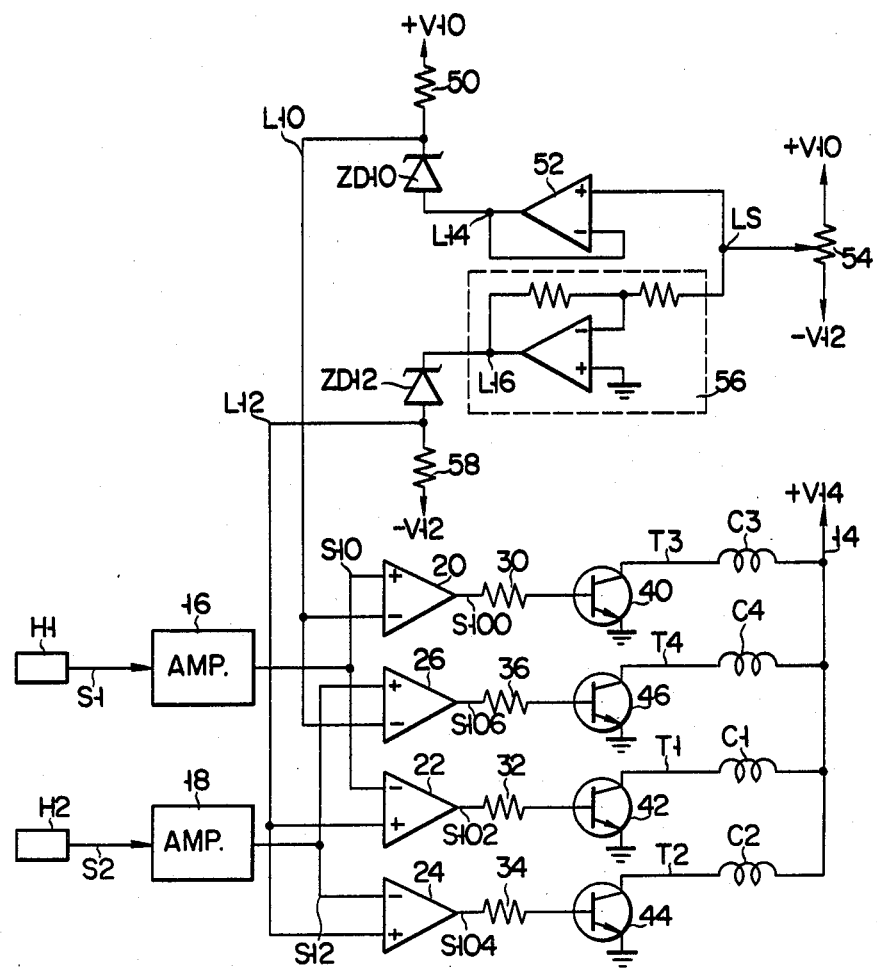
FIG. 2 is a circuit diagram showing a motor control circuit in the case where the present invention is employed in a 4-phase motor.

FIG. 2 shows an example of a motor control circuit for driving and controlling the motor shown in FIG. 1. Detection signals S1 and S2 obtained from the Hall elements H1 and H2 are applied to amplifiers 16 and 18, respectively. An output signal S10 of amplifier 16 is applied to the non-inverted input of a level comparator 20 and the inverted input of a level comparator 22, while an output signal S12 of amplifier 18 to the inverted input of a level comparator 24 and the non-inverted input of a level comparator 26. A first threshold level L10 is applied to the inverted inputs of comparators 20 and 26, while a second thrshold level L12 to the non-inverted inputs of comparators 22 and 24. Comparators 20–26 slice off signals S10 and S12 by predetermined threshold levels L10 and L12 to generate 4-phase pulse signals S100–S106. Signals S10 and S12 correspond to detection signals S1 and S2. Therefore, components 16–26 comprise converter means for converting detection signals (S1 and S2) to multiphase pulse signals (S100–S106), which are generated by slicing off the detection signals with predetermined threshold levels (L10 and L12).

The signals S100–S106 are applied via resistors 30–36 to the bases of NPN transistors 40–46. The emitters of transistors 40–46 are grounded. The collectors of transistors 40, 46, 42 and 44 are connected to power supply ends of the coils C3, C4, C1 and C2. One end of each of coils C1–C4 is connected via the power supply line 14 to a positive power source +V14, which is preferably a stabilizing power supply having comparatively large current handling capacity to supply power to coils C1–C4.

General-purpose OP amplifiers can be employed for the comparators 20–26. The transistors 40–46 should have capacity (such as collector dissipation and collector withstanding voltage, etc.) enough to perform switching of supply current for the coils C1–C4. However, transistors 40-46 serve only to perform ON/OFF operation and therefore generate little heat.

The threshold level L10 is lead out of a connection point between one end of a resistor 50 and the cathode of a Zener dode ZD10. The other end of resistor 50 is connected to a positive voltage source +V10 and the anode of Zener diode ZD10 to the output terminal of a non-inverting buffer 52 whose gain is 0 dB. There is generated in this output terminal a level L14 whose potential is lower by a value than the threshold level L10, said value corresponding to the Zener voltage of diode ZD10. The input terminal of buffer circuit 52 is connected to the slider of a variable resistor 54, both ends of which are connected to the positive voltage source +V10 and a negative voltage source −V12, respectively. It is preferable that these voltage sources +V10 and −V12 are voltage stabilized. A reference level LS is obtained from the slider of variable resistor 54. The reference level LS is transformed to a level L16 through an inverter circuit 56, for example, whose gain is 0 dB. The potential relation in this case is:

$$LS = L14 = -L16 \quad (1)$$

The level L16 is level-shifted only by a value to the lower potential side by means of a Zener diode ZD12, whose anode is connected via a resistor 58 to the negative voltage source −V12, said value corresponding to the Zener voltage of Zener diode ZD12. The threshold level L12 is sent out of the anode of Zener diode ZD12. Suppose that Zener voltages of Zener diodes ZD10 and ZD12 be ZV10 and ZV12, respectively, LS=L14=−L16 as described above. Therefore, $$\left. \begin{array}{l} L10 = L14 + ZV10 = LS + ZV10 \\ L12 = L16 - ZV12 = -(LS + ZV12) \end{array} \right\} \quad (2)$$

The equation (2) shows that threshold levels L10 and L12 vary according to the reference level LS. Namely, the components 50-59 comprise a means for changing the threshold levels (L10, L12). The reference level LS is usually selected to be about 0 V.

FIG. 3 shows a level slicing operation in the motor apparatus shown in FIGS. 1 and 2. When the magnet rotor 12 rotates, the Hall elements H1 and H2 generate the detection signals S1 and S2 corresponding to the change in the magnetic field caused by the rotation of rotor 12. Hall elements H1 and H2 are arranged with 90° shifted from each other and phase difference of 90° is therefore caused between the output signals S10 and S12, as shown in FIGS. 3A and 3B.

Description will now be made in order starting from the operation of the comparator 20 to successive ones. Prior to a time t10, S10<L10 and the signal S100 is therefore in low level. The transistor 40 is cut OFF at this time so as not to supply power to the coil C3, but the transistor 44 is under the ON-condition (S12<L12) to supply power to the coil C2. If the magnetic pole P2 is magnetized "S" in FIG. 1, for example, the "N" of rotor 12 is drawn to the magnetic pole P2 and forced to rotate in clockwise direction. After the time t10 and till a time t16, S10>L10. The output signal S100 of comparator 20 becomes high level at this time. The transistor 40 is turned ON to supply power to the coil C3. The magnetic pole P3 is thereby magnetized "S" to draw the "N" of rotor 12. Both of magnetic poles P2 and P3 are magnetized "S" from the time t10 to a time t12, but rotation is continued in clockwise direction due to the inertia of rotor 12.

When S12>L10 at a time t14, the output signal S106 of the comparator 26 becomes high level, to supply power to the coil C4. Power supply to the coil C4 continues from the time t14 to a time t20, during which the magnetic pole P4 is magnetized "S". The "N" of rotor 12 is therefore drawn to the magnetic pole P4. On the other hand, S10<L12 at a time t18. The output signal S102 of comparator 22 becomes high level and the transistor 42 is turned ON. As the result, power is supplied to the coil C1 and the magnetic pole P1 is magnetized "S". Magnetization of magnetic pole P1 is continued from the time t18 to a time t24 and the "N" of rotor 12 is drawn by the magnetic pole P1. When S12<L12 at a time t22, the output signal S104 of comparator 24 becomes high level, to turn ON the transistor 44. The ON-condition of the transistor 44 continues from the time t22 to a time t28, during which the magnetic pole P2 is magnetized "S". S10>L10, again, at a time t26, the same condition as at the time t10 is established. Thereafter, the rotating magnetic field is generated around the rotor 12 due to the phase shift of multiphase pulse signals S100-S106 as stated above. Signals S100, S106, S102 and S104 are averagely 90°-shifted from one another.

In the motor apparatus having an arrangement such as described above, when the current supply time for coils (C1-C4) of magnetic poles which draw the rotor 12 varies, the period and timing at which a force acts on the rotor 12 also vary. Now consider the case where power is supplied to the coil C3 during the time when no power is supplied to the coil C2. When the power supply time to the coil C3 is short (or the power supply timing is delayed) in this case, the time at which the magnetic pole P3 acts on the rotor 12 will be short and therefore, the torque of rotor 12 is also small. This also means a reduction in the rotation speed of rotor 12. On the contrary, when the power supply time to the coil C3 is long, the torque of rotor 12 will become large. In other words, the torque or rotation speed of rotor 12 changes according to the power supply time as to the coil C3 or the pulse width of pulse signal S100.

The above can be said to any one of signals S100-S106, and therefore the case of signal S100 will be employed to explain how rotation control is achieved in the motor apparatus according to the present invention. FIG. 4 shows how the pulse width of signal S100 changes when the threshold level L10 is varied. Namely, when $L10=L10_1$, the pulse width of signal $S100_1$ is narrow, while when $L10=L10_2$, the pulse width of signal $S100_2$ is wide. The threshold level L10 can be changed by varying the reference level LS using the variable resistor 54 shown in FIG. 2. It has already been explained using the equation (2). That is, when the reference level LS is changed by the variable resistor 54, the pulse width of each of signals S100-S106 varies to change the timing at which each of magnetic poles P1-P4 is magnetized, thus enabling the rotation of rotor 12 to be controlled.

Figure 5A:
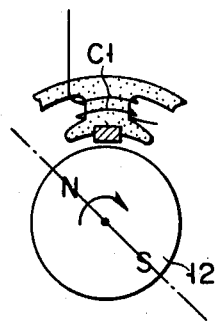
FIGS. 5A and 5B show a part of the motor arrangement shown in FIG. 1, respectively, to explain the circuit operation in relation with relative positions between the rotor and magnetic poles.
Figure 5B:
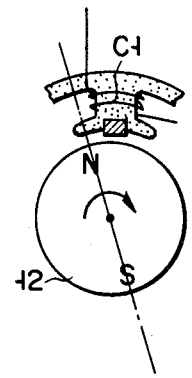

The above can be described from the structural viewpoint, as follows. When the pulse width of signal S102 applied for example to the coil C1, is wide, power is supplied to the coil C1 under the condition as shown in FIG. 5A and the magnetic pole P1 gives rotation force to the rotor 12 from this moment. On the other hand, when the pulse width of signal S102 is narrow, power supply to the coil C1 is started under the condition as shown in FIG. 5B and the rotation force is given to the rotor 12 from this moment. In other words, energy affecting the rotor 12 is large in FIG. 5A but small in FIG. 5B. Namely, the rotation of rotor 12 can be controlled according to the pulse width of each of pulse signals S100–S106.

As apparent from the above, the motor control means according to the present invention permits the rotation control of the motor without using ineffective non-saturated amplifiers. Large current handling elements for controlling the motor in FIG. 2 are only transistors 40–46, which serve to perform switching operation. Low power consumption type OP amplifiers may be used as the components 16–26 and 52, 56. Accordingly, the reduction in efficiency to the whole of the apparatus is practically negligible. Transistors 40–46, which serve only to perform ON/OFF operation, consume little power. This means that the control circuit including transistors 40–46 can be small in size and that the design for heat-sinking can be extremely simplified.

The reason why signals S100–S106 are partially overlapped with one another as shown in FIG. 3 is as follows. When the absolute value of each of threshold levels L10 and L12 is made large to avoid such overlaps, it may happen that the peak levels of signals S10 and S12 do not reach these threshold levels. If so, the result will be a case where no multiphase pulse signals (S100–S106) are generated. When threshold levels L10 and L12 are made small to prevent such defect, overlaps as shown in FIG. 3 will occur in such an arrangement as shown in FIGS. 1 and 2.

It should be understood that the present invention is not limited to the embodiment described and illustrated herein, and that various modifications and variations may be made within the scope of gist and claims of the present invention. An efficient multiphase servomotor can be gained when the output signal S10 and/or S12 (obtained from the FIG. 2 circuit) is rectified, amplified and negatively fed back via a summing device 60 (see FIGS. 6A and 6B) to the portion of the circuit of FIG. 2 of reference level LS. Hall elements, which are used as detection means, may be replaced by other elements such as magnetic detection coils. A Schmitt circuit or the like having a predetermined trigger level can be employed instead of level comparators which serve to function as converter means. The means for converting threshold levels may, for example, include non-linear elements for temperature compensation in addition to linear elements such as variable resistors.

What is claimed is:
1. A motor apparatus comprising:
a motor including a rotor;
detection means coupled to said motor for providing a detection signals corresponding to a position of said rotor;
converter means coupled to said detection means for providing multiphase pulse signals by slicing off said detection signal at a predetermined threshold level, said multiphase pulse signals being either high or low in level and overlapped with one another in the high level thereof; and
changing means coupled to said converter means for changing said threshold level;
wherein the rotation speed of said rotor is controlled in accordance with said threshold level.
2. A motor apparatus according to claim 1, wherein said motor comprises exciting coils, and further comprising means coupled to said motor and to said converter means, for driving said exciting coils of said motor according to said multiphase pulse signals.
3. A motor apparatus comprising:
a motor including a rotor;
detection means coupled to said motor for providing detection signals corresponding to respective positions of said rotor;
converter means coupled to said detection means for providing multiphase pulse signals by slicing off said detection signals at a predetermined threshold level; and
changing means coupled to said converter means for changing said threshold level;
said converter means including comparators for comparing said detection signals with at least one predetermined threshold level and providing said multiphase pulse signals when said detection signals exceed said at least one predetermined threshold level;
wherein the rotation speed of said rotor is controlled in accordance with said threshold level.
4. A motor apparatus comprising:
a motor including a rotor;
detection means coupled to said motor for providing a detection signal corresponding to a position of said rotor;
converter means coupled to said detection means for providing multiphase pulse signals by slicing off said detection signal at a predetermined threshold level; and
changing means coupled to said converter means for changing said threshold level;
said detection means including means for converting a magnitude of a magnetic field corresponding to a position of said rotor to an electrical field;
wherein the rotation speed of said rotor is controlled in accordance with said threshold level.
5. A motor apparatus according to any one of claims 1, 2 or 4 wherein said converter means includes comparators for comparing said detection signals with predetermined threshold levels and providing said multiphase pulse signals when said detection signals exceed said threshold levels.
6. A motor apparatus according to any one of claims 1, 2 or 3 wherein said detection means includes means for converting a magnitude of a magnetic field corresponding to a position of said rotor to an electrical signal.
7. A motor apparatus according to claim 5 wherein said detection means includes means for converting a magnitude of a magnetic field corresponding to a position of said rotor to an electrical signal.
8. A motor apparatus comprising:
a motor including a rotor and exciting coils;
detection means coupled to said motor for providing first and second detection signals corresponding to the positions of said rotor;
amplifier means coupled to said detection means for providing first and second output signals, said first output signal corresponding to said first detection signal and said second output signals corresponding to said second detection signal;
a first comparator for comparing said first output signal with a first threshold level to provide a first pulse signal;
a second comparator for comparing said first output signal with a second threshold level to provide a second pulse signal;

a third comparator for comparing said second output signal with said second threshold level to provide a third pulse signal;

a fourth comparator for comparing said second output signal with said first threshold level to provide a fourth pulse signal;

changing means for generating a reference level corresponding to said first and second threshold levels and changing said reference level; and driver means for applying exciting currents, which correspond to said first through fourth pulse signals, to said exciting coils of said motor, respectively.

9. A motor apparatus according to claim 8, wherein said first through fourth pulse signals are either high or low in level and are sequentially overlapped with one another in the high level thereof.

10. A motor apparatus comprising:
a motor including a rotor and exciting coils;
detection means coupled to said motor for providing first and second detection signals corresponding to the positions of said rotor;
amplifier means coupled to said detection means for providing first and second output signals, said first output signal corresponding to said first detection signal and said second output signal corresponding to said second detection signal;
a first comparator for comparing said first output signal with a first threshold level to provide a first pulse signal;
a second comparator for comparing said first output signal with a second threshold level to provide a second pulse signal;
a third comparator for comparing said second output signal with said second threshold level to provide a third pulse signal;
a fourth comparator for comparing said second output signal with said first threshold level to provide a fourth pulse signal; and
said first through fourth pulse signals being either high or low in level and being sequentially overlapped with one another in the high level thereof.

* * * * *